H. A. CHURCH.

Ornamental Chain.

No. 9,578. Reissued Feb. 22, 1881.

WITNESSES:

Joseph A. Miller Jr.

Wm. L. Cook.

INVENTOR:

Henry A. Church by Joseph A. Miller

Atty

N. PETERS, PHOTO-LITHOGRAPHER, WASHINGTON, D. C.

UNITED STATES PATENT OFFICE.

HENRY A. CHURCH, OF PROVIDENCE, RHODE ISLAND.

ORNAMENTAL CHAIN.

SPECIFICATION forming part of Reissued Letters Patent No. 9,578, dated February 22, 1881.

Original No. 204,800, dated June 11, 1878. Application for reissue filed March 20, 1880.

*To all whom it may concern:*

Be it known that I, HENRY A. CHURCH, of the city and county of Providence, and State of Rhode Island, have invented new and useful Improvements in Ornamental Chains; and I hereby declare that the following is a full, clear, and exact description of the same, reference being had to the accompanying drawings, forming part of this specification.

This invention has reference to that class of ornamental chains in which the links are formed, by stamping or otherwise, out of thin metal plates, so that when doubled the one blank will form a complete link, the central portion, when doubled, forming the hinge, and one end the loop by means of which the several links are secured together; and it consists in the peculiar arrangement by which the two ends of the doubled blank, after being passed through the hinge of the next link, are interlocked within the interior of the links, so that the ends of each link are concealed from view and the several links firmly secured to each other without soldering any portion of the links.

Figure 1:
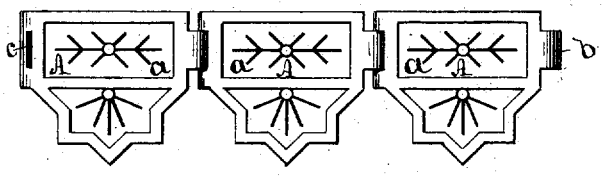
Figure 2:
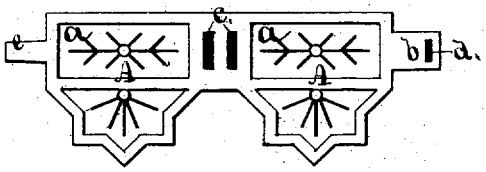
Figure 3:
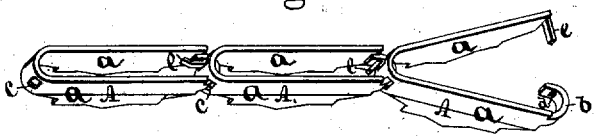

Figure 1 represents a chain made of doubled sheet-metal links, both sides of which are alike, and in which the links are secured one to the other by a loop passing through two slits of the next link and held by a bent hook. Fig. 2 is a view of one blank, forming, when doubled, one link in which both sides are alike. Fig. 3 is a perspective view, looking edgewise, of a chain made after this invention.

In the drawings, A represents one of the links of which the chain is made. The outlines or ornamentations form no part of this invention, as any form of link and any desired design may be adapted in chains of this construction. Arm, neck, and other bands and girdles may also be made in the same manner as chains out of doubled sheet-metal links, and be interlocked and formed without soldering any part.

*b* is the loop, formed at one end of the blank, Fig. 2, of a width nearly the length of the slits *c c*, which, when the blank is doubled, forms the hinge. The loop *b* is provided with the slit *d*, of a width nearly the width of the tongue *e*.

When a chain is made the blank shown in Fig. 2 is first doubled, so that the metal between the two slits *c c* will form one end, and the loop *b* and tongue *e* the other end, of the link. A number of links so bent and formed are secured together by passing the loop *b* through the slits *c c*. The tongue *e* is now bent and passed through the slit *d* and secured, as shown in Fig. 3, and the chain is thus completed without soldering.

In the chains heretofore made of similar blanks, provided with the slits *c c* and the loop *b*, the blank was bent in the same manner, and the links secured one to the other by passing the loop *b* through the slits *c c*, and by soldering the end of the loop *b* to the blank. By my construction I avoid this soldering of the loop, as it requires considerable time and skill, and necessitates the refinishing of the chain and repolishing of the same, which subject the hinges to considerable wear.

In the manufacture of this class of jewelry it is important to finish and complete the separate parts before securing the same together, as they can be more readily handled, and the different parts readily polished by machinery in every part. When, now, such articles have to be secured by solder, the heat used in soldering discolors the article, destroys the polish, and so softens the metal that it is liable to bend and become distorted, the surplus solder must be removed, the color must be restored, and the whole article refinished; but the injury produced by the heat on the metal cannot be repaired in such articles, as they cannot be hardened. They are therefore liable to bend and lose their shape.

By the present invention all this is avoided. The blank can be finished and polished before it is bent, and the finished links put together without soldering. The ends, being interlocked, are firmly held, forming a strong ornamental chain in which both sides are alike, in which the metal has the stiffness produced by stamping, and which may be highly finished by machinery, and thus a superior article produced at a price impossible in the old method.

Having thus described my invention, I claim as new and desire to secure by Letters Patent—

1. A chain-link blank composed of a piece of sheet-metal stamped or otherwise made to shape, and having a tongue on one end and a hook or slitted tongue on the other end, with slits arranged intermediately of said ends, substantially as shown and described.

2. A chain-link composed of a single strip of stamped metal doubled to form two sides, *a a*, and slitted between said sides, to adapt it for engagement with an adjacent link, as described, the ends of the sides of the open end of the link being adapted to be engaged and interlocked in the formation of a chain, substantially as specified.

3. A chain consisting of a series of doubled links hinged together by a loop on one side of the open end of one link, passed through slits in the adjacent link, and interlocked with the opposite side by a tongue, substantially as described.

4. A chain composed of links consisting of the sides *a a*, having slits *c c* formed at one end of the link, the opposite ends being provided, one with the loop *b*, having the slit *d*, and the other with the tongue or clamp *e*, arranged to unite the links by passing the loop *b* through the slits *c c*, and securing the same by bending the tongue over the loop, as described.

HENRY A. CHURCH.

Witnesses:

JOSEPH A. MILLER,
JOSEPH A. MILLER, Jr.